United States Patent
Sugimoto et al.

(10) Patent No.: US 7,215,825 B2
(45) Date of Patent: May 8, 2007

(54) IMAGE-GENERATING METHOD AND IMAGE-GENERATING SYSTEM

(75) Inventors: Kenji Sugimoto, Tokyo (JP); Kaori Nagai, Tokyo (JP); Satoshi Kusano, Tokyo (JP)

(73) Assignees: Taisei Corporation, Tokyo (JP); Pioneer Corporation, Tokyo (JP)

( * ) Notice: Subject to any disclaimer, the term of this patent is extended or adjusted under 35 U.S.C. 154(b) by 698 days.

(21) Appl. No.: 10/356,530

(22) Filed: Feb. 3, 2003

(65) Prior Publication Data

US 2003/0152286 A1  Aug. 14, 2003

(30) Foreign Application Priority Data

Feb. 8, 2002 (JP) ............... P.2002-032652

(51) Int. Cl.
*G06K 9/40* (2006.01)
(52) U.S. Cl. .............. 382/274; 382/165; 382/167; 358/3.26; 358/3.27
(58) Field of Classification Search .......... 382/165, 382/167, 219, 274, 275, 164; 358/518, 463, 358/3.26, 3.27
See application file for complete search history.

(56) References Cited

U.S. PATENT DOCUMENTS

| | | | |
|---|---|---|---|
| 3,736,856 A | | 6/1973 | Grossmann et al. |
| 5,539,523 A | * | 7/1996 | Nakai et al. .............. 358/296 |
| 5,581,670 A | * | 12/1996 | Bier et al. .............. 715/856 |
| 5,805,169 A | * | 9/1998 | Harada et al. .............. 345/634 |
| 5,852,675 A | | 12/1998 | Matsuo et al. |
| 6,007,332 A | * | 12/1999 | O'Brien .............. 433/26 |
| 6,014,221 A | * | 1/2000 | Plude, Jr. .............. 356/402 |

(Continued)

FOREIGN PATENT DOCUMENTS

EP    0 893 914 A2    1/1999

(Continued)

OTHER PUBLICATIONS

C. Neelmeijer et al., "The Merits of Particle Induced X-Ray Emission in Revealing Painting Techniques"; Nuclear Instruments and Methods in Physics Research B 189 (2002); (pp. 293-302).

(Continued)

*Primary Examiner*—Matthew C. Bella
*Assistant Examiner*—Yosef Kassa
(74) *Attorney, Agent, or Firm*—Drinker Biddle & Reath LLP

(57) ABSTRACT

An image-generating system for generating data of an image on the basis of data of a photographic image obtained by capturing an image of an object. The image-generating system includes a color sample to be arranged in the proximity of an object, an illumination unit, an image pick-up unit, a color sample specifying unit and an image processing unit. The illumination unit can illuminate the object and the color sample with light lower in light quantity than ordinary light. The image pick-up unit obtains a photographic image by capturing an image of the object together with the color sample illuminated by the illumination unit. The color sample specifying unit specifies the color sample in the photographic image. The image processing unit converts colors of the object in the photographic image, taking the color sample specified by the color sample specifying unit as a reference.

17 Claims, 6 Drawing Sheets

U.S. PATENT DOCUMENTS

| | | | | |
|---|---|---|---|---|
| 6,043,894 | A | * 3/2000 | Van Aken et al. | 356/425 |
| 6,046,723 | A | * 4/2000 | Daniels et al. | 345/600 |
| 6,128,001 | A | * 10/2000 | Gonsalves et al. | 345/589 |
| 6,636,646 | B1 | * 10/2003 | Gindele | 382/274 |
| 6,658,163 | B1 | * 12/2003 | Takaoka | 382/254 |
| 6,792,136 | B1 | * 9/2004 | Niesen | 382/118 |

FOREIGN PATENT DOCUMENTS

| | | |
|---|---|---|
| JP | 52-001333 | 1/1977 |
| JP | 62-157555 | 7/1987 |
| JP | 2000-321617 | 11/2000 |
| WO | WO 98/39627 A2 | 9/1998 |
| WO | WO 02/13136 A2 | 2/2002 |

OTHER PUBLICATIONS

Arnaldo de Albuquerque Araujo et al; "Enhancement of Sketch Contours on Paintings Infrared Photographies by Optimal Filtering"; 1997 IEEE; (pp. 231-236).

Berns, R., "The Science of Digitizing Paintigs for Color-Accurate Image Archives: A Review," *Journal of Imaging Science and Technology*, vol. 45. No. 4, Jul./Aug. 2001; pp. 305-325.

Blackwell, B., "Light Exposure to Sensitive Artworks during Digital Photography," *Spectra* 26(2), 24-28 (2000), pp. 1-8.

* cited by examiner

RESTORATION →

IMAGE-GENERATING METHOD AND IMAGE-GENERATING SYSTEM

The present disclosure relates to the subject matter contained in Japanese Patent Application No. 2002-032652 filed Feb. 8, 2002, which is incorporated herein by reference in its entirety.

BACKGROUND OF THE INVENTION

1. Field of the Invention

The present invention relates to an image-generating method and an image-generating system for generating data of an image on the basis of data of a photographic image obtained by capturing an image of an object.

2. Background Art

For protection of an object such as an old painting by restoration or regeneration, the object of protection has been heretofore manually restored or regenerated while checked by eye observation. Examples of the old painting are a painting on a folding screen, a painting on a scroll, a painting on a fusuma, and a painting on a ceiling.

When the color or shape (painting range) of a portion in a painting needing to be repaired was not clear at the time of restoration, the painting was repaired by analyzing a pigment of the color used in this portion; preparing the same kind of pigment on the basis of the analysis; and painting it. When the contour of a painting pattern was unknown, the painting was repaired as the contour was determined by referring to literature, etc.

SUMMARY OF THE INVENTION

In the repairing method, there is a possibility that the object cannot be accurately restored to its original condition in terms of shape and color because repair depends on skill of a specialist engaged in the repair.

Moreover, when the object is damaged again after restored, it is necessary to retry the same restoring operation. That is, if the method of repairing a real article is used, the necessity of repairing the real article will come again in the future because the real article is always changing with the passage of time even after repair.

If only one portion of the object is repaired, hue difference is generated between the repaired portion and the other original portion in the case where the material, color, etc. of the other original portion have already changed with the passage of time. That is, if the pigment actually used is analyzed and a pigment is prepared newly on the basis of the analysis, the new pigment cannot form a hue corresponding to a change of the pigment with the passage of time.

Moreover, because the object of protection itself is repaired, one and the same object cannot remain as it is. When, for example, the object of protection is a traditional heritage, it is preferable that direct repairing of the object itself can be avoided.

It is also conceived that an object of protection may be repaired on its photograph or printing after an image of the object is captured in the form of a photograph or printing. In most cases, such an object of protection is set or kept in a relatively dark place. It is therefore necessary to illuminate the object of protection with light for capturing an image of the object of protection. Further, for the image of the object of protection to be captured surely, it is necessary to illuminate the object of protection with light not lower in light quantity than ordinary light. There is however a problem that the object of protection may be damaged by heat beams or ultraviolet rays in illumination light when the object is illuminated with the ordinary light or light not lower in light quantity than the ordinary light.

In consideration of such circumstances, therefore, an object of the invention is to provide an image-generating method and an image-generating system by which an object of protection such as a painting can be accurately restored on image data without being directly repaired.

(1) In order to solve the problem, the invention provides an image-generating method having the steps of: arranging a color sample in the proximity of a object; obtaining a photographic image by capturing an image of the object together with the color sample while illuminating the object and the color sample with light lower in light quantity than ordinary light; and converting colors of a portion of the object in the photographic image by referring to the color sample in the photographic image to thereby generate data of an image of the object equivalent to an image of the object captured under ordinary light.

(2) Preferably, the image-generating method further includes the steps of: taking in infrared rays emitted from the object as an infrared image; and correcting the image of the object on the basis of the infrared image.

(3) Further, the invention provides an image-generating system having: a color sample arranged in the proximity of a object; an illumination unit for illuminating the object and the color sample with light lower in light quantity than ordinary light; an image pick-up unit for obtaining a photographic image by capturing an image of the object together with the color sample in a state in which the object and the color sample are illuminated with light from the illumination unit; a color sample specifying unit for specifying the color sample in the photographic image obtained by the image pick-up unit; and an image processing unit for converting colors of the object in the photographic image by referring to the color sample specified by the color sample specifying unit to thereby generate data of an image of the object equivalent to an image of the object captured under ordinary light.

(4) Preferably, the color sample is a gray chart.

(5) Further, the image processing unit may include a correction unit for correcting variation in brightness of the light with which the object is illuminated.

(6) Preferably, the image-generating system further includes an infrared image input unit for taking in infrared rays emitted from the object as an infrared image. The image processing unit includes an infrared image correction unit for correcting the image of the object on the basis of the infrared image input by the infrared image input unit.

(7) Preferably, the image-generating system further has a printing unit for printing an image on the basis of the image data generated by the image processing unit.

According to the invention as in (1) and (3), a photographic image is obtained by capturing an image of the object together with the color sample while illuminating the object and the color sample with light lower in light quantity than ordinary light. Then, colors of a portion of the object in the photographic image obtained are converted by referring to the color sample in the photographic image to thereby generate data of an image of the object equivalent to an image of the object captured under ordinary light. That is, data of an image of the object equivalent to an image of the object captured under ordinary light is obtained while the quantity of light applied on the object for capturing an image of the object is suppressed to prevent the object from being damaged.

According to the invention as in (2) and (6), the image of the object is corrected on the basis of the infrared image of infrared rays emitted from the object.

When, for example, one and the same pigment is used in regions of a painting, the quantities of infrared rays received from the regions are substantially equal to each other. For this reason, according to the invention as in (2) and (6), the image of the object is corrected on the basis of the infrared image while an obscure portion of the object such as a painting is specified.

Further, according to the invention as in (4), a gray chart is used as the color sample. The photographic image is adjusted by referring to the gray chart to thereby obtain data of an image of the object equivalent to an image of the object captured under ordinary light.

Further, according to the invention as in (5), variation in brightness of illumination light applied on the object is corrected.

Generally, when a linear light source or a point light source is used, variation in illumination light occurs on the object. For example, light is not evenly applied on the object. According to the invention as in (5), variation in brightness of illumination light, which occurs on the object in this manner, is corrected.

Further, according to the invention as in (7), the image of the object is printed on the basis of the image data generated. Thus, the printed image becomes equivalent to an image of the object captured under ordinary light.

DETAILED DESCRIPTION OF THE PREFERRED EMBODIMENTS

An embodiment of the invention will be described below in detail with reference to the drawings. This embodiment is a restoration system which has an image processing system according to the invention and which is formed so that an object of protection such as a painting is restored as electronic data.

Figure 1:
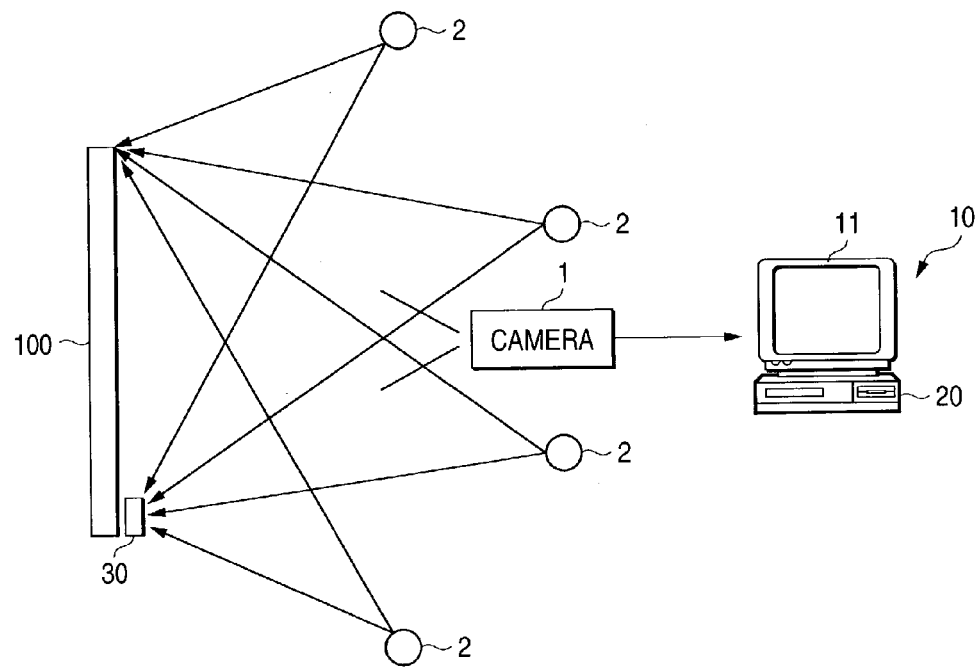
FIG. 1 is a view showing the configuration of a restoration system as an embodiment of the invention.
Figure 2:
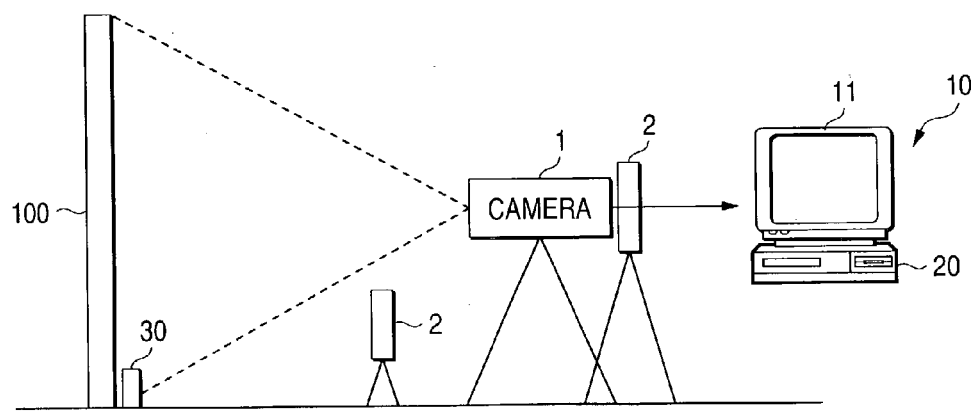
FIG. 2 is a side view showing the configuration of the restoration system.

FIGS. 1 and 2 show the configuration of this restoration system. As shown in FIGS. 1 and 2, the restoration system has: a camera 1 as an image pick-up unit for capturing an image of a object 100 of protection such as a painting; a plurality of light sources 2 as an illumination unit for illuminating the object of protection with light; and a personal computer 10 for processing data of the image captured by the camera 1. The restoration system further has a color corrector 30. An image of the color corrector 30 is captured together with the image of the object 100 by the camera 1.

Here, the object 100 of protection is a painting deteriorated with the passage of time, such as a painting on a folding screen, a painting on a scroll, a painting on a fusuma, and a painting on a ceiling. For example, an image of a painting on a folding screen which is kept open indoors is captured by the camera 1 of the restoration system.

Figure 3:
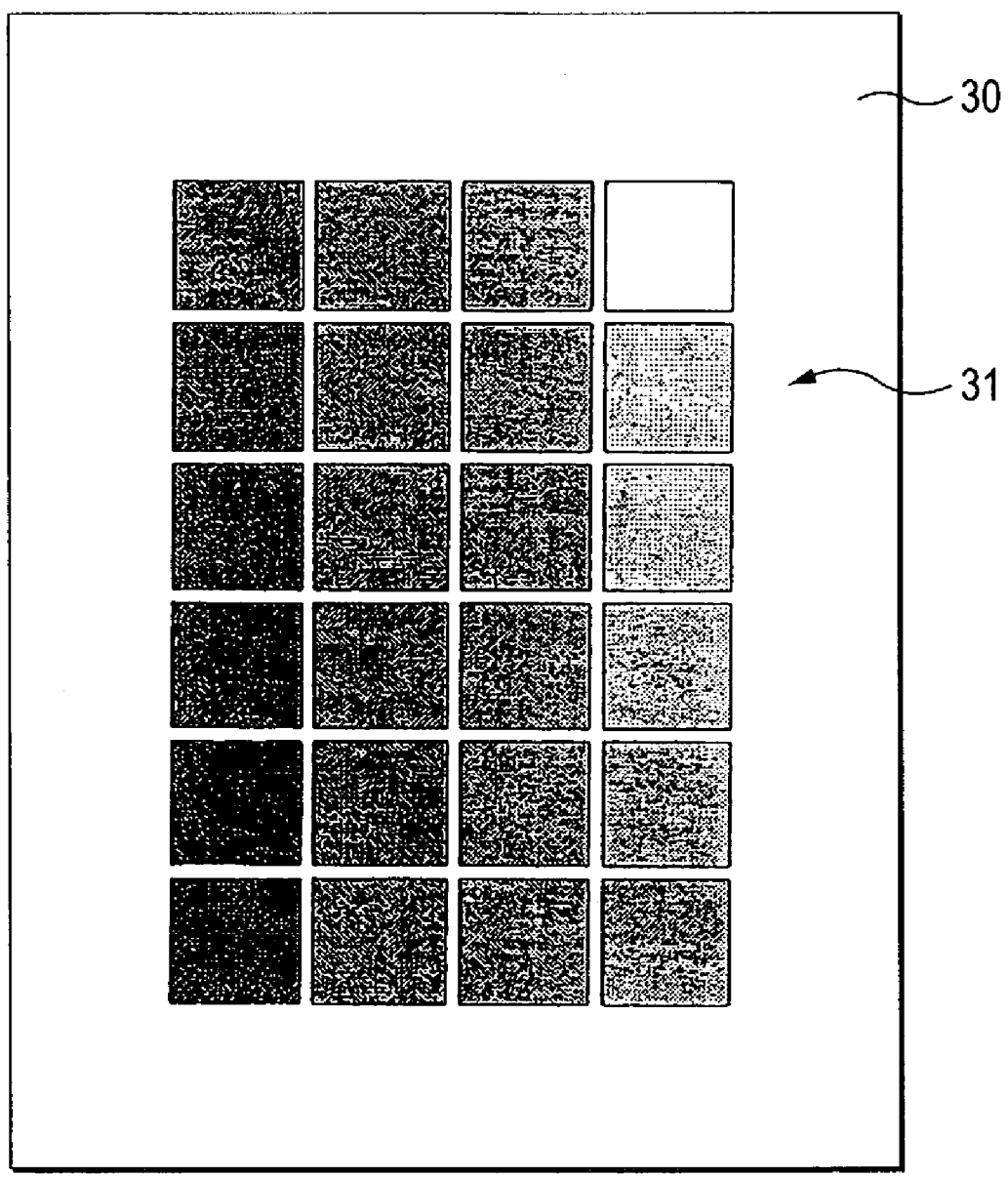
FIG. 3 is a plan view showing a color corrector having a gray chart attached thereto.

The color corrector 30 provides a color material for repairing the painting. For example, as shown in FIG. 3, the color corrector 30 is a substantially plate-like body having a gray chart 31 as a color sample attached on its surface.

The gray chart 31 has grid-like partitions. In this embodiment, the gray chart 31 has 4×6 partitions. The partitions are painted with gradations of a chromatic color changing from white to back stepwise. In this embodiment, the gray chart 31 is formed so that the color becomes deeper as the position in the gray chart 31 moves down and left as shown in FIG. 3.

For example, each of the light sources 2 is a fluorescent lamp. The fluorescent lamp is superior to any other light source such as an incandescent lamp in terms of power saving and low heat generation. Further, the light sources 2 are formed so that the quantity of light emitted from the light sources 2 can be adjusted. Generally, when the quantity of light applied on the object of protection is low, the quality (S/N) of the photographic image data is low. Therefore, the adjustment of the quantity of light applied on the object is decided in consideration of the tolerance limit of quality, the performance of the camera 1, and so on.

The camera 1 can capture an image of the object so as to obtain a photographic image of the object. For example, the camera 1 is a digital camera that can capture a photographic image as digital data. For example, an image pick-up portion is constituted by a CCD (Charge Coupled Device). Further, the camera 1 is a high-resolution scanning type camera that can capture a photographic image of the object as digital image data by scanning the object. The camera 1 has a function for adjusting the quantity of light, so as to have a range of illumination light quantity allowing a photographic image to be captured. It is a matter of course that even in the case where the quantity of illumination light is constant, there is a range of light quantity allowing a photographic image to be captured, in accordance with a lens and an iris used.

The camera 1 is formed so that photographic image data can be externally output to an external apparatus. For example, the camera 1 has an external output terminal for outputting data on-line or through a detachable recording medium as an external output unit. Hence, the photographic image data obtained by capturing the image of the object 100 of protection in the state in which the object 100 of protection is illuminated with light from the light sources 2 is output from the camera 1 to the personal computer 10 as an external apparatus by the external output unit.

The personal computer 10 has a body 20, and a monitor 11. The personal computer 10 is formed to perform image processing of the photographic image data obtained from the camera 1.

Figure 4:
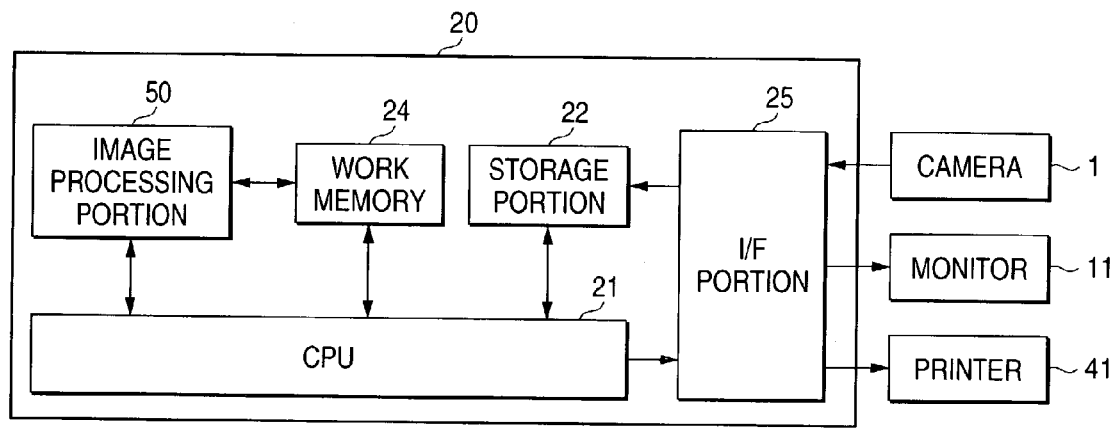
FIG. 4 is a block diagram showing the configuration of a body of a personal computer.

As shown in FIG. 4, the body 20 has: a CPU 21 for controlling respective portions of the personal computer 10; a storage portion 22 for storing various kinds of data; an image processing portion 50 as an image processing unit for processing an image; a work memory 24 used as a work area for image processing by the image processing portion 50; and an interface (I/F) portion 25 for data input/output between the personal computer 10 and any one of external apparatuses.

The I/F portion 25 can perform transmission/reception of data between the personal computer 10 and any one of external apparatuses such as the camera 1, the monitor 11 and the printer 41. When, for example, the external output unit for outputting the photographic image data from the camera 1 is achieved by a recording medium, the I/F portion 25 has a recording medium attachment slot which is formed so that photographic image data recorded in the recording medium attached into the recording medium attachment slot is stored in the storage portion 22. The I/F portion 25 outputs image display data to the monitor 11 and outputs print data to the printer 41. Here, the printer 41 is a color printer. It is preferable that the printer 41 is a high-resolution printer because the object 100 of protection as a print target is a painting on a folding screen, etc., as described above.

For example, various kinds of data and various kinds of programs are stored in the storage portion 22. The various kinds of programs include application programs executed by the personal computer 10 for performing image processing.

Figure 5:
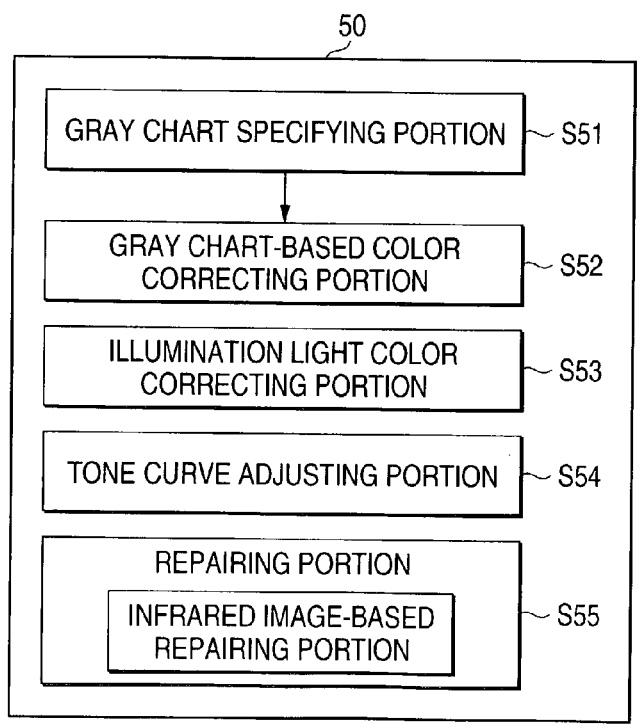
FIG. 5 is a block diagram showing the configuration of an image processing portion of the personal computer.

The image processing portion 50 is formed so that image processing of photographic image data stored in the storage portion 22 is performed on the work memory 24. As shown in FIG. 5, the image processing portion 50 has a gray chart specifying portion 51, a gray chart-based color correcting portion 52, an illumination light color correcting portion 53, a tone curve adjusting portion 54, and a repairing portion 55.

The gray chart specifying portion 51 is a color sample specifying unit for specifying the gray chart from the photographic image of the photographic image data containing the image of the object of protection. For example, the gray chart specifying portion 51 specifies the gray chart by retrieving a region of a predetermined pattern from the photographic image expanded on the work memory 24 using the fact that the gray chart 31 has such a predetermined pattern.

The gray chart-based color correcting portion 52 performs color correction or color adjustment of the photographic image on the basis of the gray chart specified from the photographic image by the gray chart specifying portion 51. Color adjustment is made so that all gradations in the gray chart are obtained as gradations of achromatic color. For example, color correction is made as follows.

The image is expanded on the work memory 24. On the other hand, the specified gray chart is compared with a reference gray chart stored in the storage portion 22 of the body 20. Color correction of the whole of the photographic image expanded on the work memory 24 is performed so that the specified real gray chart coincides with the reference gray chart. As a result, the image can be color-corrected as a whole, so that the captured image can be obtained as an image equivalent to an image that can be appreciated under ordinary light.

The illumination light color correcting portion 53 performs color correction in consideration of illumination light based on characteristic of the light sources 2.

Generally, light from a point light source or a linear light source is unevenly applied on the object. Hence, variation in brightness occurs on the object in such a manner that the object is bright at a position nearer its center but darker at a position nearer its edge. For this reason, also in the restoration system, the same phenomenon occurs even in the case where the light sources 2 are used.

Therefore, the illumination light color correcting portion 53 corrects variation in brightness of the quantity of illumination light on the object due to the light sources 2. For example, data of illumination patterns of the light sources 2 on the object are stored in the storage portion 22. The illumination light color correcting portion 53 uses the data as correction data for correcting variation in brightness of the quantity of illumination light which occurs on the object in the photographic image data obtained by really capturing the image.

The tone curve adjusting portion 54 performs gradation adjustment by tone curve adjustment while monitoring respective levels in the gray chart.

The repairing portion 55 repairs the object of protection on data. For example, the contents of repairing include: removal of dirt by handling, mildew, etc.; and repair of a portion that is damaged too badly to identify a painting pattern.

For example, the personal computer 10 has an automatic repair mode for performing automatic repair, and a manual repair mode for performing manual repair. The repairing portion 55 operates in the automatic repair mode, for example, performs repair by interpolation on the basis of comparison of a repair portion with other regions such as surroundings of the repair portion.

Further, in the manual repair mode, manual repair is performed as follows. For example, in the condition that the image of the object of protection is displayed on the monitor 11, a user designates a repair place through a region pointing unit such as a mouse and adds colors on the basis of user's sensation to thereby perform repair.

The repairing portion 55 has an infrared image-based repairing portion 55a as an infrared image correcting unit. Repair can be also made on the basis of infrared photographing by the infrared image-based repairing portion 55a. In this case, the camera 1 has a function of an infrared image input unit which is formed so that a photographic image can be taken in as infrared image data based on infrared rays emitted from the object 100 of protection.

For example, the repairing portion 55 compares the photographic image obtained by normal image pickup as described above, with the infrared image. When a different portion is found on the basis of the comparison, the repairing portion 55 repairs the different portion as a part of the object 100 of protection. On this occasion, the comparison between the photographic image and the infrared image is performed in the form of binary images. Incidentally, the principle of repair using the infrared image is based on the fact that raw materials such as paints constituting the object 100 of protection are different in heat conduction from one another.

The CPU 21 is a control unit for controlling respective portions of the personal computer 10 inclusive of respective constituent portions of the body 20. That is, for example, the CPU 21 controls the I/F portion 25 to output data to the monitor 11 and the printer 41 respectively.

The restoration system is configured as described above.

Figure 6:
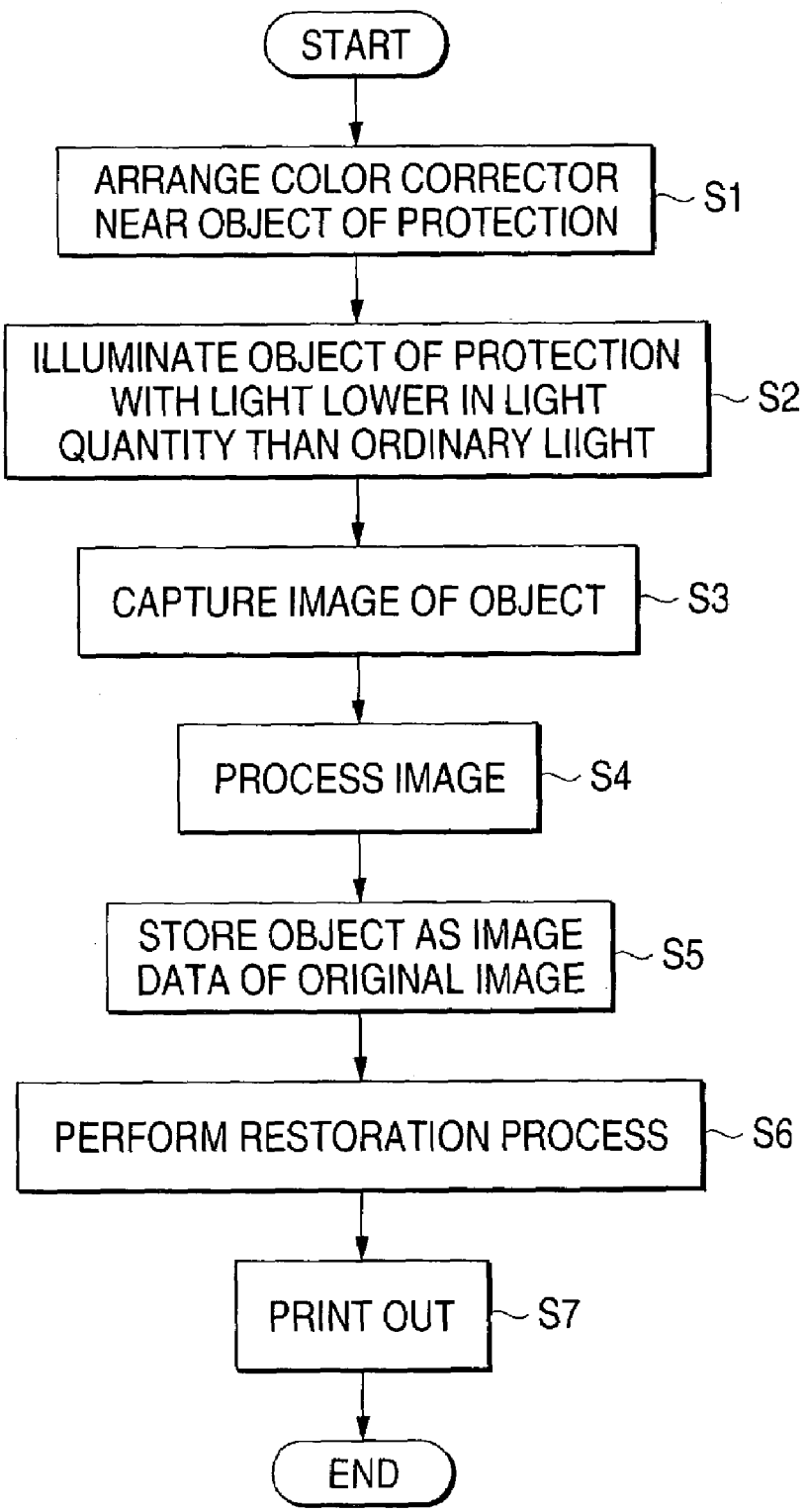
FIG. 6 is a flow chart showing a procedure of restoration by the restoration system.

Restoration of the object 100 of protection as an object of restoration by this restoration system will be described below. FIG. 6 shows a procedure of the restoration.

First, in step S1, the color corrector 30 is arranged near the object 100 of protection as shown in FIGS. 1 and 2. Then, in step S2, the color corrector 30 and the object 100 of protection are illuminated with light of the light sources 2 lower in light quantity than ordinary light. For example, the quantity of light is suppressed to a limit allowing sufficient image quality to be obtained by the camera 1.

Then, in step S3, images of the color corrector 30 and the object 100 of protection are captured by the camera 1.

Figure 7:
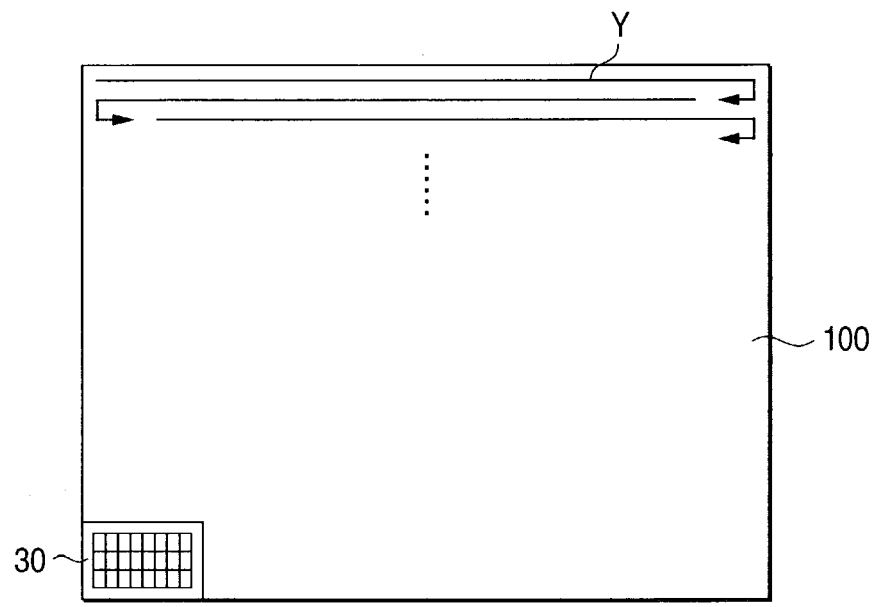
FIG. 7 is a view showing a scanning direction of a camera.

FIG. 7 shows a state in which the photographic image of the object is taken in by the scanning type camera 1. In the camera 1, the scanning position moves down while scanning is made in the direction of the arrow Y in FIG. 7, that is, laterally, so that the object 100 of protection and the color corrector 30 are taken in as a photographic image.

Here, for example, the photographic image data taken in are once checked by the monitor or the like as to whether there is any black underflow or white overflow portion in the photographic image or not. For example, the monitor mentioned here may be a liquid-crystal monitor integrated with the camera 1 or may be a monitor connected to the output terminal of the camera 1.

When there is some black underflow or white overflow portion in the image as a result of this checking, offset adjustment or light quantity adjustment is performed and then image pickup is made again so that an image having no crashed potion can be obtained.

The photographic image data obtained by picking up the image in this manner is sent from the camera 1 to the personal computer 10 on-line or through a recording medium. In step S4, image processing is performed on the basis of the photographic image data by the image processing portion 50 of the personal computer 10.

In this restoration system, the object 100 of protection is illuminated with light from the light sources 2 but the quantity of the light is reduced to a limit allowing an image to be captured by the camera 1, in order to prevent the object of protection from being damaged. Accordingly, the photographic image under this condition is so dark that a painting pattern of the object 100 of protection cannot be specified from the photographic image. Therefore, image processing is performed so that the color of the photographic image can be adjusted to a color equivalent to the color that is appreciated under ordinary light. Incidentally, a procedure of image processing by the personal computer 10 will be described later.

After image processing is performed, in step S5, the image data is stored as image data of an original image of the object 100 of protection in the storage portion 22 of the body 20. As a result, the object 100 of protection can be stored as electronic data in the storage portion 22 in a state in which the electronic data can form an image equivalent to an image of the object captured under ordinary light.

Then, in step 6, the object 100 of protection is repaired on the thus obtained image data by the repairing portion 55 of the image processing portion 50. That is, the object of protection is corrected on the photographic image to thereby repair the object of protection on the image data.

On this occasion, the repair mode may be selected from an automatic repair mode and a manual repair mode so that the object of protection can be automatically or manually repaired on data. In the automatic repair mode, the repairing portion 55 performs repair. In the manual repair mode, the user performs repair.

For example, the contents of repairing include: removal of dirt by handling, mildew, etc.; and repair of a portion that is damaged too badly to identify a painting pattern. Repair is also performed on the basis of an infrared image. An obscure contour due to peeling in a painting pattern can be changed to a clear contour by repair based on the infrared image.

The image data of the object of protection repaired thus is stored as data different from the image data obtained by color correction before repair. For example, the repaired image data of the object 100 of protection stored thus can be output as a painting printed on paper from the printer 41 in step S7 following the repairing step.

Figure 8:
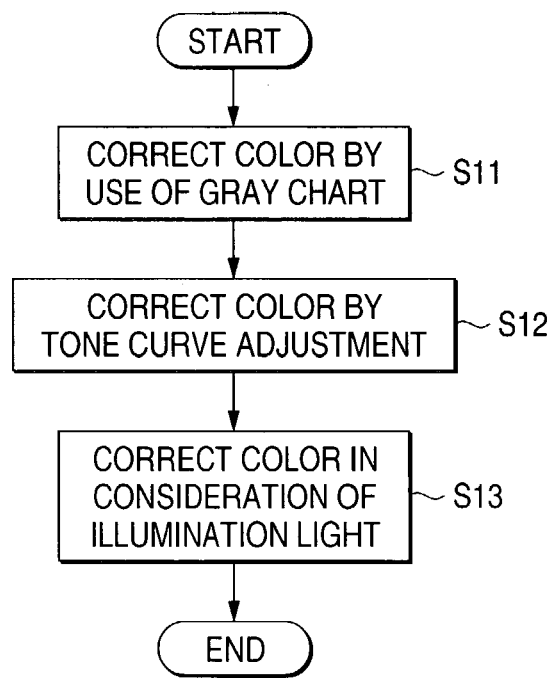
FIG. 8 is a flow chart showing a procedure of image processing.

The procedure of image processing by the image processing portion 50 in the step S4 will be described below. FIG. 8 shows the procedure of image processing.

First, in step S11, the photographic image is expanded on the work memory 24 and subjected to color correction by use of the gray chart.

In the color correction by use of the gray chart, first, the gray chart is specified from the photographic image expanded on the work memory 24 by the gray chart specifying portion 51. Then, the gray chart-based color correcting portion 52 compares the specified real gray chart with a reference gray chart and performs color correction of the photographic image so that the real gray chart coincides with the reference gray chart. As a result, the image is color-adjusted as a whole, so that the captured image can be obtained as an image equivalent to an image that can be appreciated under ordinary light.

After the color correction performed thus, in step S12, the tone curve adjusting portion 54 performs gradation adjustment by tone curve adjustment while monitoring the respective levels in the gray chart. Then, in step S13, the illumination light color correcting portion 53 corrects variation in brightness of the quantity of illumination light on the object due to the light sources 2.

Image processing in the step S4 is performed as described above. The image data obtained by the image processing is stored as image data of an original image in the step S5.

The restoration system as an embodiment according to the invention has been described above.

As described above, in the restoration system, the image of the object 100 of protection is captured in the condition that the quantity of light emitted from the light sources 2 is reduced to the utmost. Accordingly, the image of the object 100 of protection can be captured while the object 100 of protection is prevented from being damaged by illumination with intensive light. For example, the object 100 of protection is a historic painting such as a painting on a folding screen, a painting on a scroll, a painting on a fusuma or a painting on a ceiling. Images of these historic paintings can be captured without damage.

Moreover, when a fluorescent lamp low in heat generation is used as each of the light sources 2, the object 100 of protection can be more effectively prevented from being damaged by illumination with light.

Moreover, in the restoration system, because the image of the object 100 of protection is captured without pressing and moving the object 100 of protection, the object 100 of protection can be prevented from being damaged by pressure, movement, etc.

Moreover, in the restoration system, the gray chart is used as the color sample for color correction as described above.

When, for example, the image of the object of protection is captured in the condition that the quantity of light emitted from the light sources is reduced to the utmost, a photographic image is obtained in a state near a monochrome tone. Therefore, the gray chart is used for color correction, so that even in the condition that the image is captured while the quantity of light is reduced to the utmost, an image of the object of protection equivalent to an image obtained under ordinary light can be obtained accurately.

Moreover, as described above, variation in brightness of illumination light applied on the object 100 of protection is corrected on the photographic image data. Accordingly, the object of protection as seen under ordinary light can be reproduced accurately on the photographic image data.

Moreover, as described above, after infrared rays emitted from the object 100 of protection are obtained as an infrared image, the object 100 of protection is repaired on data on the basis of the infrared image. Accordingly, a portion of the object 100 of protection in which a painting pattern is obscure can be repaired on data.

Further, in the restoration system, the restored image may come into a state in which the image cannot be appreciated perfectly under ordinary light in spite of color adjustment of the image on the basis of the gray chart. When the infrared image is used, however, the boundary of a region constituted by the same pigment can be specified. Accordingly, even in the case where the boundary of a region constituted by the same pigment is obscure, the image can be reproduced clearly up to the boundary of the region.

Figure 9A:
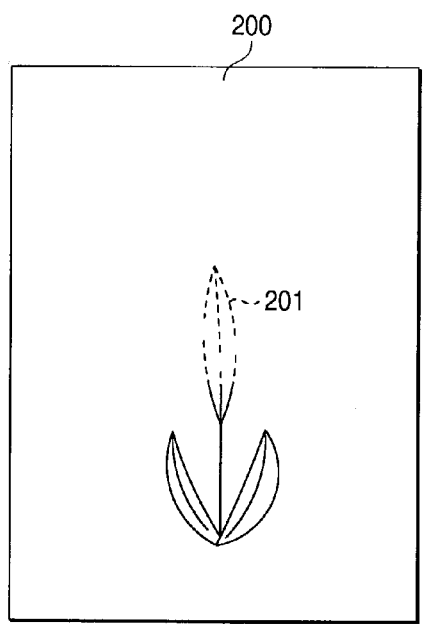
FIG. 9A is a view showing an object of protection before restoration.
Figure 9B:
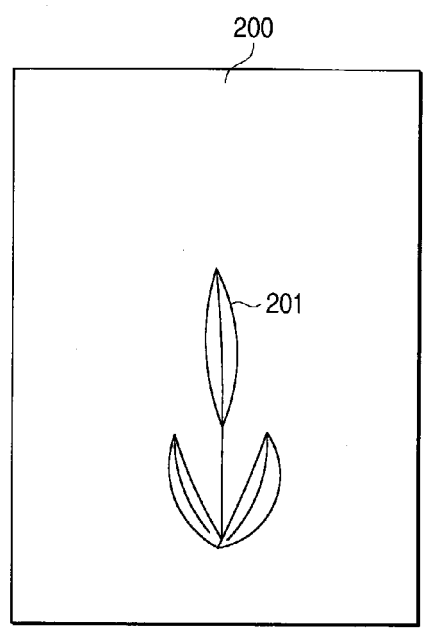
FIG. 9B is a view showing an object of protection after restoration.

For example, FIG. 9A shows a painting before repair and FIG. 9B shows the painting after repair. The painting before repair shown in FIG. 9A has a contour portion 201 which is obscure as represented by the broken line. It may be impossible to correct the contour portion 201 completely into a state in which the image can be appreciated under ordinary light in spite of color adjustment of the image by use of the gray chart. When the image is repaired on the basis of the infrared image, the contour portion 201 can be repaired as shown in FIG. 9B.

Moreover, in the restoration system, the repaired image data of the object of protection obtained by repair on image data can be stored. That is, in the restoration system, the object of protection after repair can be obtained without repairing directly on the object of protection itself. Accordingly, while the object of protection is left as it is, the restored object of protection can be obtained, though, as a printing or an image displayed on a monitor. Moreover, because the object of protection is repaired as image data in this manner, the image data can be stored in a so-called electronic library for the public to use. The object of protection after repair can be browsed by the public so that the image of the object of protection can be used widely.

Moreover, the restoration system can reform the object of protection into a valuable book. That is, for example, the restoration system can be used for reading a book in a library or the like as data.

For example, in a collection of the books, there are some books which may have only character information. In this case, the book having only character information is easy to scan, so that a large capacity of memory is not required. On the other hand, when a book contains painting/photograph information, a large capacity of memory is however required, so that a general memory server cannot meet this requirement. In this case, for example, a system including data compression and data decompression and a huge memory server are required.

In a collection of books containing painting/photograph information, books called historically valued books are, however, more troublesome because such books are discolored or faded when illuminated with intensive light emitted from a scanning machine.

This kind of valued book may be often in a state in which an adhesive agent and a binder used for binding the book have already deteriorated. On the other hand, in a general scanning machine, an object of scanning needs to be pressed against a glass surface of the machine. If such a valued book in a state in which an adhesive agent and a binder used for binding the book have already deteriorated is intensively pressed against the glass surface, there is, however, a possibility that the valued book may be torn at its joint because of the force of pressing.

For these reasons, the requirement for storing such a valued book as data is that high-quality data is taken in from the valued book under light which is weak so as not to deteriorate the valued book, and without touching the valued book.

Incidentally, X-ray analysis may be used as a method for specifying materials of an original painting. In this case, materials such as wood, metal, etc. may be specified by X-ray analysis with no problem but materials such as dyes are easily destroyed by exposure to X-rays. Accordingly, damage of the original painting is inevitable. Therefore, an X-ray shield box is required.

In material analysis, it is obvious that the painting is less damaged when confirmation of materials and identification of metal components can be performed from an energy absorption spectrum by the ordinary way of applying X-ray analysis to a small amount of powder. The demerit of X-ray analysis is limitation in size of an object of analysis as well as such damage of an original painting. That is, X-ray analysis cannot be adapted to a large-size object. Further, X-ray analysis cannot be adapted to a three-dimensional painting such as a fresco.

The restoration system according to the invention can solve these problems. That is, the restoration system can store valued books in the form of electronic data accurately without damage of the valued books. Particularly, when some books among the valued books are invaluable, the restoration system is effective means for restoring such invaluable books.

Artistic judgment as well as technical consideration is important in preservation and restoration of a painting on an old scroll. That is, for example, it is important that the painting on the old scroll in the existing state in which colors and patterns are obscure due to discoloration is impressed as dignity and history, and that finished painting's beauty is recovered by restoration. The restoration system can achieve these demands, so that expression faithful to the original painting can be made regardless of painter's skill. Although ordinary restoration/reproduction is surely influenced by painter's skill, this restoration system can express the original painting faithfully regardless of the influence of painter's skill.

In other words, the restoration system can make an invisible matter visible to the naked eye by aerial digital scanning (or spatial digital scanning), infrared photography, digital tone processing, image analysis, fluorescence illumination, etc.

Dye-based paints are easily destroyed by ultraviolet rays contained in sunlight. Phthalocyanine-based blue called ultramarine is changed to red because of ionic change by ultraviolet rays or alkali. It has been found recently that there is no conservative force if phthalocyanine-based blue is not replaced by cobalt blue having high durability. It is a matter of course that various techniques are used freely for reproduction. However, if there is a possibility that the original painting may be damaged by restoration, the thought about restoration is that the original painting is left as it is until technical development in the future succeeds.

In this sense, in a restoration system using so-called aerial scanning for achieving restoration, there is provided a restoration method which is unique in that the intensity of light is weakened to prevent the original painting from being damaged, and in that the object can be restored even in the case where the object is a three-dimensional or large-size object.

Incidentally, the invention is not limited to application to the embodiment.

That is, though the embodiment has shown the case where a gray chart is used as the color sample, the invention is not limited thereto but maybe applied also to the case where another material is used as the color sample. In this case, since a photographic image in a state near a monochrome tone is obtained by capturing the image of the object of protection in the condition that the quantity of light emitted from the light sources is reduced to the utmost, it is necessary that the color sample can be used for color correction which is performed by using such an image. For example, a color palette having a plurality of chromatic colors may be used as the color sample if the color palette can satisfy this premise.

Although the embodiment has shown the case where a fluorescent lamp is used as each of the light sources, the invention is not limited thereto. For example, a material low in heat generation or a material not damaging the object of protection may be used as each of the light sources.

Figure 10:
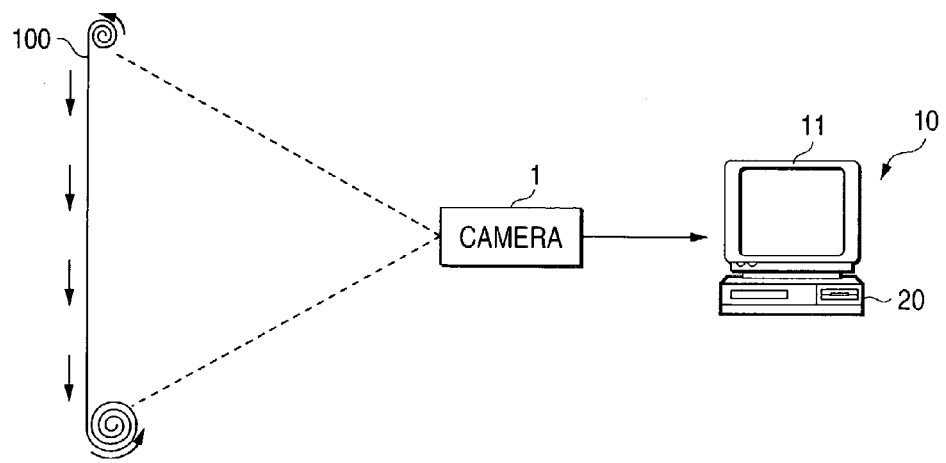
FIG. 10 is a view used for explaining the case where an image of the object of protection is captured while moved relative to the camera.

Although the embodiment has shown the case where the object of protection is fixed, the invention is not limited thereto. For example, as shown in FIG. 10, the image of the object of protection may be captured in the condition the object of protection is moved relative to the camera 1, for example, in such a manner that the object of protection is wound up to the fixed camera 1.

Although the embodiment has shown the case where the camera 1 has an infrared photographing function when repair is made on the basis of infrared photographing, the invention is not limited thereto. For example, the restoration system may have an image pick-up device provided exclusively for infrared photograph use and separately from the camera 1 so that infrared image-based repair is performed on the basis of infrared image data obtained by the image pick-up device.

Although the embodiment has shown the case where the gray chart in the photographic image is automatically specified by the image processing portion 50, the invention is not limited thereto. For example, the gray chart in the photographic image may be manually specified by the user through a pointing unit such as a mouse in the condition that the photographic image is displayed on the monitor 11. In this case, the color correcting portion 52 performs color collection by using an image portion specified by the user as the gray chart.

Incidentally, when the gray chart in the photographic image is automatically specified, there is an effect that the image processing time can be shortened.

Although the embodiment has shown the case where fluorescent lamps are used as the light sources, the invention may be applied also to the case where the light sources are constituted by fluorescent and infrared lamps. In this case, the fluorescent and infrared lamps can be used appropriately for obtaining the infrared image surely.

Although the embodiment has shown the case where the image processing unit is achieved by the image processing portion 50 as a processing function of the personal computer 10, the invention is not limited thereto. For example, the image processing unit may be formed as a dedicated device. In addition, the program used for such image processing by the personal computer 10 may be recorded in an available recording medium.

(Image-Generating Method)

In the restoration system described above, the following image-generating method is achieved.

That is, in the restoration system, there is provided an image-generating method having the steps of: arranging a color sample in the proximity of a object; obtaining a photographic image by capturing an image of the object together with the color sample while illuminating the object and the color sample with light lower in light quantity than ordinary light; and converting colors of a portion of the object in the photographic image by referring to the color sample in the photographic image to thereby generate data of an image of the object equivalent to an image of the object captured under ordinary light.

As described above, according to the invention, data of an image of the object equivalent to an image of the object captured under ordinary light is obtained while the quantity of illumination light applied on the object for capturing an image of the object is suppressed. Hence, there is an effect that the object of protection such as a painting can be restored accurately on data without being directly repaired. In addition, because the quantity of light used for capturing an image of the object of protection is suppressed, there is an effect that the object of protection can be prevented from being damaged.

Further, according to the invention, the photographic image can be corrected while an obscure portion of the object such as a painting is specified. Hence, there is an effect that the object can be automatically restored on data.

Further, according to the invention, the gray chart is used as the color sample. Hence, there is an effect that data of an image of the object equivalent to an image of the object captured under ordinary light can be obtained even in the condition that the quantity of illumination light is reduced to the utmost.

Further, according to the invention, variation in brightness of illumination light applied on the object is corrected on the photographic image data. Hence, there is an effect that the object of protection under ordinary light can be reproduced accurately on data.

According to the invention, an image is printed on the basis of the generated image data. Hence, there is an effect that an image of the object equivalent to an image of the object captured under ordinary light can be obtained as a printing.

What is claimed is:

1. An image-generating method comprising:
    arranging a color sample in the proximity of an object;
    obtaining a photographic image by capturing an image of the object together with the color sample by an image pick-up unit while illuminating the object and the color sample with light lower in light quantity than ordinary light; and
    converting colors of a portion of the object in the photographic image by referring to the color sample in the photographic image to generate data of an image of the object equivalent to an image of the object captured under ordinary light.

2. The image-generating method according to claim 1, further comprising:
    taking in infrared rays emitted from the object as an infrared image; and
    correcting the image of the object on the basis of the infrared image.

3. An image-generating system comprising:
    a color sample to be arranged in the proximity of an object;

an illumination unit capable of illuminating the object and the color sample with light lower in light quantity than ordinary light;

an image pick-up unit which obtains a photographic image by capturing an image of the object together with the color sample illuminated by the illumination unit;

a color sample specifying unit which specifies the color sample in the photographic image; and an image processing unit which converts colors of the object in the photographic image by referring to the color sample specified by the color sample specifying unit to generate data of an image of the object equivalent to an image of the object captured under the ordinary light.

4. The image-generating system according to claim 3, wherein the color sample is a gray chart.

5. The image-generating system according to claim 3, wherein the image processing unit includes a correction unit which corrects deviation in brightness of the light with which the object is illuminated.

6. The image-generating system according to claim 3, further comprising:

an infrared image input unit which takes in infrared rays emitted from the object as an infrared image;

wherein the image processing unit includes an infrared image correction unit which corrects the image of the object on the basis of the infrared image input by the infrared image input unit.

7. The image-generating system according to claim 3, further comprising a printing unit which prints an image on the basis of the image data generated by the image processing unit.

8. The image-generating method according to claim 1, wherein the object is an object of protection which may be damaged by heat beams or ultra-violet rays.

9. The image-generating system according to claim 3, wherein the object is an object of protection which may be damaged by heat beams or ultra-violet rays.

10. The image-generating method according to claim 1, wherein the color sample is a gray chart.

11. The image-generating method according to claim 1, wherein the object and the color sample are illuminated with light sources constituted by fluorescent and infrared lamps, and appropriately using the fluorescent and infrared lamps for obtaining the infrared image surely.

12. The image-generating system according to claim 1, wherein the illumination unit is constituted by fluorescent and infrared lamps which can be appropriately used for illuminating the object and the color sample for obtaining the infrared image surely.

13. An image-generating method comprising:

arranging a color sample in the proximity of an object of protection which may be damaged by heat beams or ultra-violet rays; and obtaining a digital photographic image by capturing an image of the object together with the color sample by an image pick-up unit;

specifying a gray chart from the color sample of the photographic image;

comparing the specified gray chart with a reference gray chart and performing color correction of the photographic image so that the specified gray chart coincides with the reference gray chart;

wherein said object of protection and the color sample are illuminated with light sources constituted by fluorescent and infrared lamps, said photographic image being taken while illuminating the object of protection and the color sample with light of a quantity reduced to a limit allowing an image to be captured so as to prevent the object of protection from being damaged;

and wherein said method further comprises:

taking in, by said image pick-up unit, infrared rays emitted from the object of protection as an infrared image; and comparing the photographic image with the infrared image and repairing the portions which differ on the basis of the infrared image.

14. An image-generating system comprising:

an image pick-up unit which obtains a digital photographic image by capturing an image of an object of protection, which may be damaged by heat beams or ultra-violet rays, together with a color sample illuminated by an illumination unit;

a color sample specifying unit which specifies a gray chart from the color sample of the photographic image; and a gray chart-based color correcting unit which compares the specified gray chart with a reference gray chart and performs color correction of the photographic image so that the specified gray chart coincides with the reference gray chart, wherein said illumination unit is constituted by fluorescent and infrared lamps and is capable of illuminating the object of protection and the color sample with light of a quantity reduced to a limit allowing an image to be captured so as to prevent the object of protection from being damaged; and wherein said image pick-up unit takes in infrared rays emitted from the object as an infrared image; said system further comprising an infrared image correction unit which compares the photographic image with the infrared image and repairs the portions which differ on the basis of the infrared image.

15. The image-generating system according to claim 14, wherein the color sample is a gray chart.

16. The image-generating system according to claim 14, wherein said system further comprises a correction unit which corrects a deviation in brightness of the light with which the object of protection is illuminated.

17. The image-generating system according to claim 14, further comprising a printing unit which prints an image on the basis of the image data generated.

* * * * *